United States Patent [19]

Mostert

[11] Patent Number: 4,937,138

[45] Date of Patent: Jun. 26, 1990

[54] HOT MELT POLYBUTYLENE AND POLY(BUTYLENE/ETHYLENE) ADHESIVES AND LAMINAR STRUCTURES

[75] Inventor: Simon Mostert, Cypress, Tex.

[73] Assignee: Shell Oil Company, Houston, Tex.

[21] Appl. No.: 161,874

[22] Filed: Feb. 29, 1988

[51] Int. Cl.$^5$ .................. B32B 27/18; B32B 27/32; C08K 5/00; C08K 5/01

[52] U.S. Cl. ............................ 428/286; 156/334; 428/288; 428/290; 428/348; 428/349; 428/354; 428/461; 428/513; 428/516; 524/291; 524/488; 524/504; 524/505; 524/71; 524/74; 524/78; 524/240; 526/935; 604/366

[58] Field of Search ............... 428/286, 288, 290, 348, 428/349, 354; 524/291, 488, 504, 505; 525/71, 74, 78, 240; 526/935

[56] References Cited

U.S. PATENT DOCUMENTS 3,362,940  1/1968  Edwards et al. .
3,408,341  10/1968 Joyner et al. .
4,320,209  3/1982  Chatterjee ............................. 525/6
4,321,334  3/1982  Chatterjee ........................... 524/579
4,322,503  3/1982  Chatterjee ........................... 524/229
4,554,304  11/1985 Hansen et al. ...................... 524/291
4,568,713  2/1986  Hansen et al. ...................... 524/241
4,576,983  3/1986  Chatterjee et al. ................. 524/101
4,579,900  4/1986  Chatterjee et al. ................. 524/291

Primary Examiner—James C. Cannon

[57] ABSTRACT

A hot melt adhesive, a laminar structure, and nonwoven article fabricated from a blend comprising:
  from about 50 percent by weight to about 5 percent by weight of a butene-1 homopolymer or copolymer;
  from about 50 percent by weight to about 95 percent by weight of a tackifying resin;
  from a 0.01 to about 1 phr of a nucleating agent;
  up to about 1 part per hundred (phr) of a stabilizer;
  up to about 30 phr of a plasticizer; and
  up to about 30 phr of a wax.

31 Claims, 2 Drawing Sheets

HOT MELT POLYBUTYLENE AND POLY(BUTYLENE/ETHYLENE) ADHESIVES AND LAMINAR STRUCTURES

BACKGROUND OF THE INVENTION

This invention relates to hot melt adhesives which exhibit a controllable open time. In particular, this invention relates to hot melt butene-1 homopolymer and butene-1-ethylene copolymer adhesives.

Adhesive open time which we are referring to is the maximum time at which adhesion (adhesion to itself or to a substrate) can take place for material after it is cooled from the melt to room temperature. Hot melt adhesives which exhibit a long open time (greater than 20 minutes), as well as good cold metal bonding, have long been sought for various applications which require a long open time. For example, expansive surfaces to be coated by adhesives such as table tops to which formica is bonded or assembly line auto parts which are coated with adhesive or sealant and later contacted with other parts at some point further down the assembly line are particularly suited to the use of hot melt adhesives which display long open times. Sometimes adhesive coated parts must remain uncontacted for as long as several hours, and thus, require longer open times than are exhibited by and characteristic of polymers typically used in nonpressure sensitive hot melt adhesives.

Hot melt adhesives can be formulated to be pressure sensitive and have an infinite open time but these adhesives are usually soft, tacky and have limited strength and adhesion. Conventional hot melts such as formulations of poly(ethylene/vinylacetate), polyethylenes, polyamides, or polyesters are rigid, form good strong bonds to certain substrates but have short open time usually less than 1 minute. Moreover, these adhesives usually have problems in adhering to cold metal substrates which is often required for automotive applications.

Solvent applied contact adhesives can be formulated to give good bond strengths and reasonable open times but they require the use of solvents which can be toxic, a pollutant and/or a fire hazard. The polybutylene adhesives are unique in that they require no solvents, have long open times, and show improved adhesion to cold metal substrates.

The butene-1 homopolymer and copolymers are a unique group of olefinic polymers because of their slow crystallization rate. The very slow crystallization rate of butene-1 homopolymers and copolymers, in contrast to the crystallization rate of other crystalline polymers such as EVA, polyethylene and polypropylene, have been found to be beneficial in formulating novel hot melt adhesives which have very long open times as well as good adhesion and bonding to cold, heat-sink type substrates (metals, such as stainless steel and anodized aluminum).

The addition of a nucleating agent will increase the rate of crystallization of butene-1 homopolymer and copolymers. This has been found beneficial in the formulation of hot melt adhesives where the open time can be tailored to the application.

SUMMARY OF THE INVENTION

A hot melt adhesive and a laminar structure fabricated from a blend comprising:

from about 50 percent by weight to about 5 percent by weight of a butene-1 homopolymer or copolymer;
from about 50 percent by weight to about 95 percent by weight of a tackifying resin;
from about 0.01 to about 1 phr of a nucleating agent;
up to about 1 part per hundred (phr) of a stabilizer;
up to about 15 phr of a plasticizer; and
up to about 15 phr of a wax.

DETAILED DESCRIPTION

Figure 1:
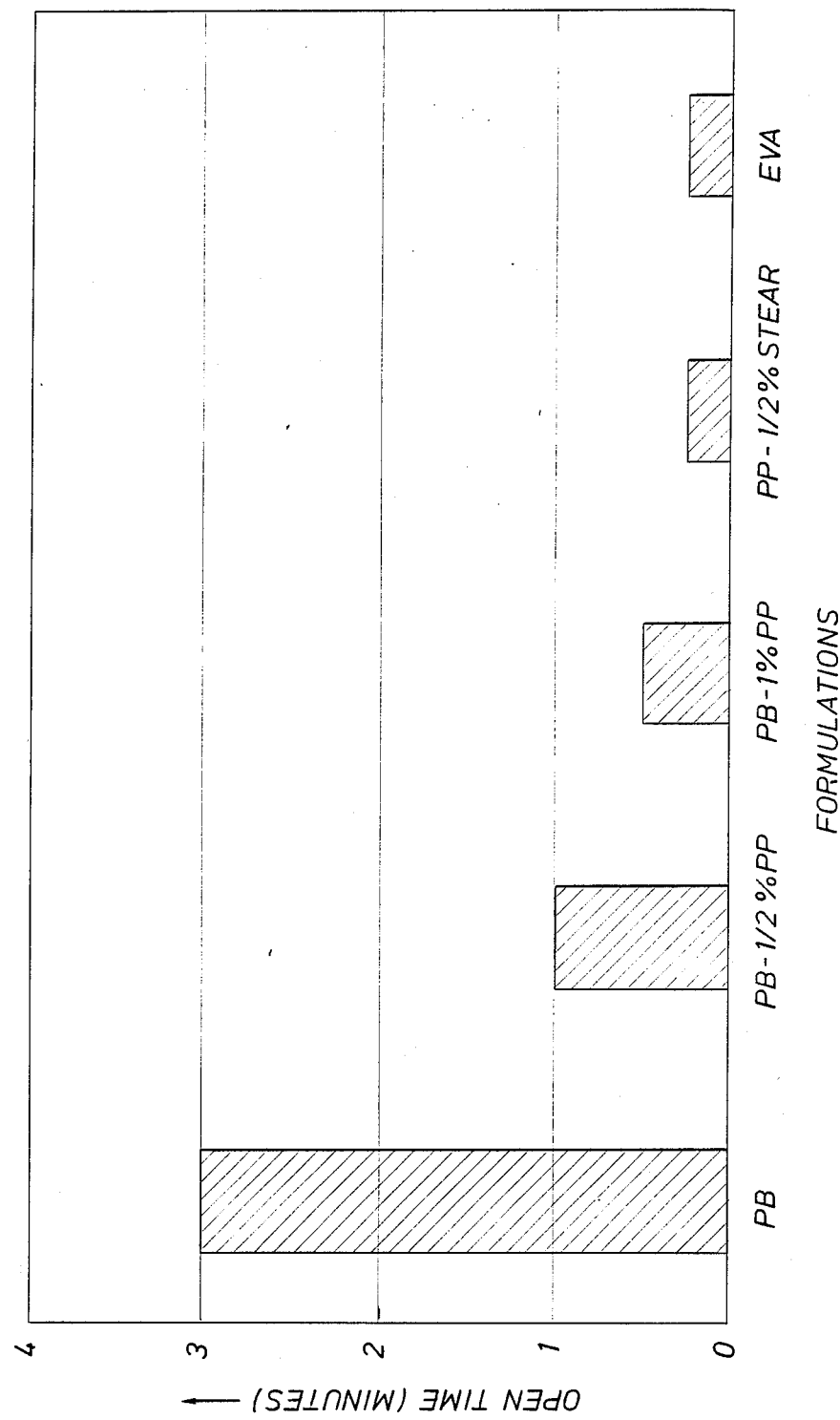

Butene-1 homopolymers and copolymers useful with the present invention are primarily linear chain molecules with regular and spatially ordered arrangements of ethyl side groups; the groups that result when butene-1 is polymerized across the 1,2 carbon double bond along an ethylene chain backbone, (see for example U.S. Pat. No. 3,362,940). When cooled from a melt, the ethyl side groups initially align in a tetragonal spatial arrangement, (form II). With time the tetragonal crystalline phase form II transforms into a stable hexagonal spatial arrangement (form I) with subsequent development of improved physical properties.

Butene-1 copolymers can comprise one or more of a variety of alpha-olefins, see for example the butene-1 copolymers taught in U.S. Pat. No. 3,362,940. Butene-1/ethylene copolymers, with ethylene comonomer in the range of 0.5-20 mole percent are expected to be useful in the inventive hot melt adhesive as the ethylene comonomer lowers the glass transition temperature (Tg) of the amorphous phase, and reduces both the crystallization rate and the ultimate level of crystallinity in the polymer. It is contemplated that 11 mole % comonomer content is particularly useful.

The butene-1 polymers of the present invention can be butene-1 copolymers with a comonomer of propylene, ethylene, or an alpha olefin having from 5 to 8 carbon atoms and a comonomer mole percent of between 1 and 30 mole % based on the entire copolymer.

If, for example, butene-1 copolymer is used with ethylene as the comonomer, then a preferred mole percent of the comonomer is about 11. It is expected that butene-1 copolymers as the butene-1 component in the final formulation will be most preferred for use within the scope of the present invention.

The butene-1 homopolymers and copolymers usable within the scope of the present invention, can be selected from polymers in a wide range of melt flows, from 0.25 to 1000 MF.

It is expected that from about 50 to 5% by weight of a butene-1 homopolymer or copolymer is usable in the novel formulation. It is contemplated that the usable weight percent of the butene-1 component may be from about 50 to 30 weight percent.

Modified butene-1 homopolymers and copolymers which have been functionalized with 0.1 to 5 wt % maleic anhydride as described in U.S. Pat. No. 4,554,304 are also considered as useful herein as the butene-1 component.

Since within the scope of the invention, modified or non-modified butene-1 homopolymers and modified or non-modified butene-1 copolymers are contemplated, it should be noted that modified or non-modified butene-1 copolymers as the butene-1 component are most preferred over butene-1 homopolymers for use within the scope of the present invention.

The present invention has been developed to provide a butene-1 based adhesive with open time that is adjustable and controllable based on the amount and type of nucleating agent and tackifying resin blended with the butene-1 component.

Stabilizers usable within the scope of the present invention can be hindered phenols, such as Irganox 1010, made by Ciba Geigy Corporation, Ethanox 330 made by Ethyl Corporation, or phosphorus-based stabilizers, such as Irgafos 168 made by Ciba Geigy Corp. Irganox 1010 is the most preferred stabilizer for use in this invention. The quantity of stabilizer usable within the scope of the present invention is expressed in parts per hundred (phr) based on the total amount of the components in the hot melt adhesive which are expressed in weight percent. Ethanox 330 is a 1,3,5,-trimethyl-2,4,6-tris [3,5-di-tert-butyl-4-hydroxy-benzyl] benzene. Irganox 1010 is usually referred to as tetrakis [methylene (3,5-di-tert-butyl-4-hydroxyhydrocinnamate)] methane. It is preferred to use about 0.3 phr of a stabilizer, although about 0.1 to about 2 phr is also usable within the scope of the invention.

Tackifying resins usable within the scope of the present invention can be selected from the group of nonpolar tackifying resins, such as Regalrez 1078 (a hydrogenated hydrocarbon resin) made by Hercules, Escorez 1304 (also a hydrocarbon resins) available from Exxon Chemical Company, Wingtack 95 (a synthetic polyterpene resin), or Wingtack 85, all available from Goodyear Tire and Rubber are usable herein. Within the scope of the present invention, these resins can include: partially or completely hydrogenated $C_9$- or $C_5$-based hydrocarbon reins with softening points in a range of 70° C. to 125° C. Tackifying resins usable within the scope of this invention can include polar tackifying resins. The choice of available polar tackifying resins for use within this formulation is limited since many of the polar resins are not, at least partially, compatible with the butene-1 homopolymer and copolymers. For example, Zonester 85, available from Arizona Chemical Company, is a polar tackifying resin usable herein.

Tackifying resins to be used within the scope of the present invention can be about 50-95 wt % based on the total composition, preferably 50-70% by weight of the total composition, and more preferably 50% by weight of the adhesive formulation.

The waxes of the present invention can be microcrystalline waxes, though other waxes may be usable within the scope of the present invention. The waxes are optional and may be used in amounts up to 30 phr (parts per hundred) based on the overall adhesive composition. Shellwax ® 100, 300, and 500 are examples of a waxes likely to be preferred for use within the scope of the present invention. A sufficient amount of the wax, 10 to 30 phr, and preferably 20 phr, should be usable in the invention and provide the advantage of lowering viscosity in the overall adhesive composition without substantially decreasing the adhesive strength and/or the service temperature of the adhesive.

Isotactic polypropylene or similar nucleating agents which cause the butene-1 homopolymers and copolymers to crystallize faster may be added to the novel composition in amounts ranging from about 0.01 to 1 phr of the overall adhesive formulation. Most preferably, 0.5 to 1 phr of nucleating agent is used to reduce the adhesive's open time and provide a means for controlling the open time adhesive formula.

Nucleating agents contemplated in this invention include by way of example:
 isotactic polypropylene;
 polyethylene;
 polyethylene-based waxes;
 fatty acid amides;
 amides
 anthraquinones;
 and graphitic non-turbostratic carbon.

Other nucleating agents are also contemplated for use in this invention. Graphitic non-turbostratic carbon nucleating agents are disclosed in copending application Ser. No. 183,869 filed Sept. 4, 1981 now U.S. Pat. No. 4,321,334 (having common assignee). Fatty acid amide nucleating agents are disclosed in copending application Ser. No. 216,055 filed Dec. 15, 1980, now U.S. Pat. No. 4,322,503 (having common assignee). These fatty acid amides include specifically N,N'-ethylene-bis-stearamide and stearamide. Anthraquinone nucleating agents are disclosed in copending patent application Ser. No. 218,865 filed Dec. 22, 1980, now abandoned (having common assignee). Specific anthraquinones include 1,2-dihydroxy-9,10-anthraquinone; 1,4-dihydroxy-9,10-anthraquinone; 1,5-dihyroxy-9,10-anthraquinone; 12,5,8-tetrahydroxy-9,10-anthraquinone; 9,10-anthraquinone; and sodium 2-anthraquinone sulfonate. Amide nucleating agents are disclosed in copending application Ser. No. 214,148 filed Dec. 8, 1980, now U.S. Pat. No. 4,320,209 (having common assignee). Preferred amides include 1-naphthalene acetamide; N stearoyl-p-aminophenol; mercapto-n-2-naphthylacetamide; malonamide; nicotinamide; isonicotinamide; benzamide; phthalimide; salicylamide; anthranilamide; and 1,8-napthalimide.

The quantity of nucleating agent usable within the scope of the present invention is expressed in phr of the components of the hot melt adhesive in a manner identical to the method used for expressing the quantity of stabilizer usable within the scope of this invention.

The effect of various nucleating agents on butene-1-homopolymers and butene-1-ethylene copolymers is detailed in the following Table I.

TABLE I

| Copolymer | Crystallization temp. (°C.) at 0.5% nucleating agent | | |
|---|---|---|---|
| | Homo-polymer | Low $C_2$ copolymer | High $C_2$ copolymer |
| Neat polymer | 68.7 | 48.4 | 61.3 |
| Polywax 2000[1] | 88.0 | 73.0 | 76.0 |
| HDPE Alathon 7815 | 86.6 | 70.5 | 61.5 |
| Acrawax C | 86.2 | 64.0 | — |
| Stearamide | 79.0 | 70.0 | 71.0 |
| Sodium benzoate | 80.0 | 58.5 | — |
| Polypropylene high MF | — | — | 70.1 |
| Polypropylene low MF | — | — | 66.0 |

[1]Polyethylene with molecular weight of 2000 ex Petrolite Corp.

FIG. 1 shows the effect of nucleating agents on open time of neat butene-1-ethylene copolymers, in contrast to ethylene vinylacetate (EVA).

The addition of nucleating agents to the components reduces the open time of the resultant adhesive from about 3 minutes to about 0.25 of a minute.

Figure 2:
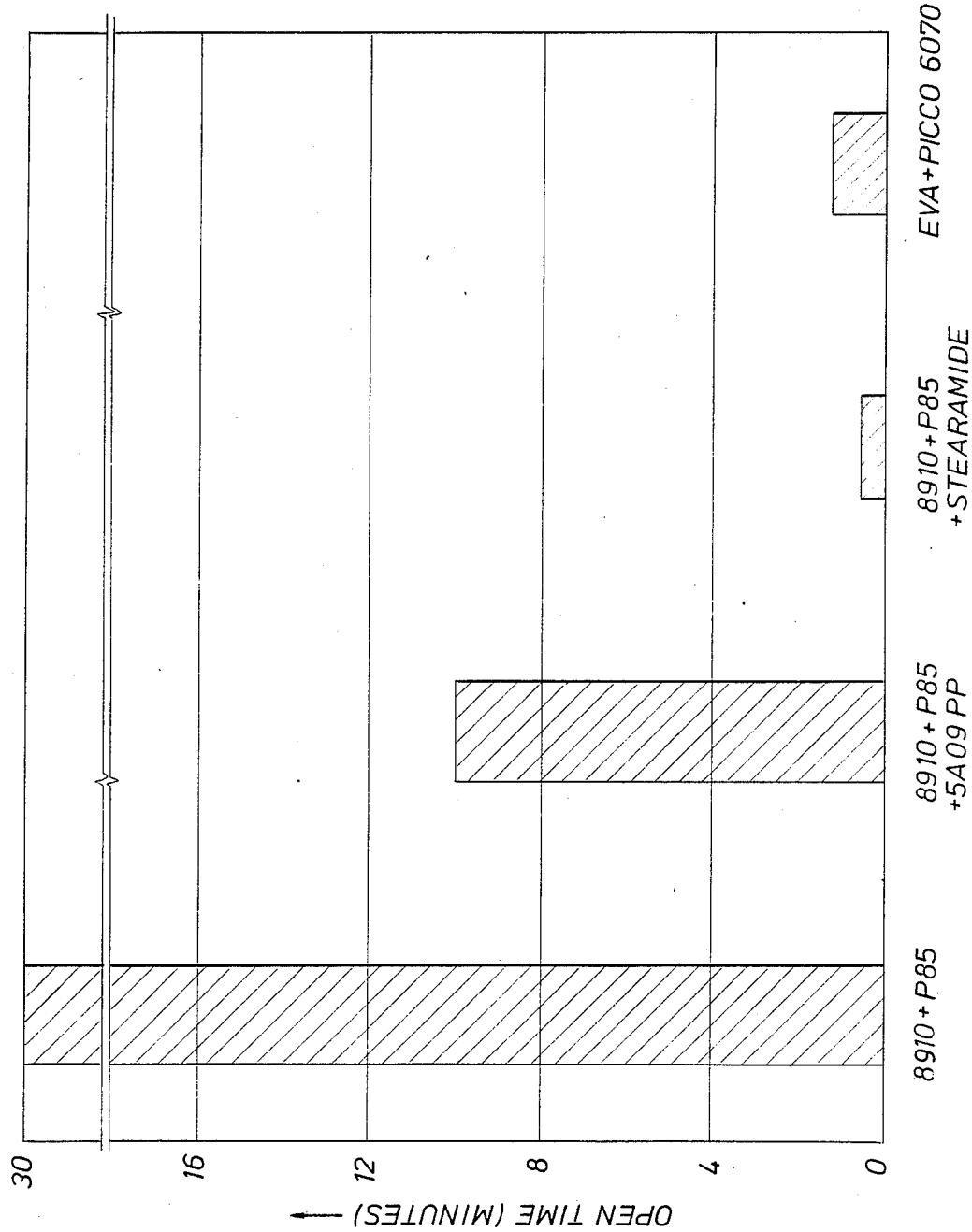

For example, blends of butene-1-ethylene copolymer such as Duraflex 8910 (available from Shell Chemical Company, of Houston, Texas, and a tackifying resin, such as Arkon P-85 available from Arakawa Chemical U.S.A. Inc. have an open time of more than 30 minutes. However, when that same formulation has a small amount of a nucleating agent, such as 0.5 phr of isotactic polypropylene added to the formulation, the open time can be reduced to 10 minutes. Further, when blends of Duraflex 8910, Arkon P85, and stearamide are blended to form an adhesive, such as in proportions of 50% by weight Duraflex 8910, 50% by weight Arkon P85, and 0.5 phr stearamide, the open time of the adhesive can be reduced to less than ½ of 1 minute. FIG. 2 shows the advantages of the present invention relative to open time more specifically.

Plasticizers, such as oils, like Shellflex ® 371, up to 30 phr can also be added to the composition to reduce the cost the final product. Atactic polyproylene such as Afax from Hercules Inc. can be usable in this novel formulation. These plasticizers may also enhance processability of the adhesive.

The present invention may also act as adhesive in a laminated structure and applied in a continuous or non-continuous manner. The laminated structure could contain one of the following as a substrate: high density polyethylene (HDPE), polypropylene (PP), paper, aluminum foil or poly-4-methyl pentene. It is not intended that the substrate of the laminated structure be limited to only the above named compounds, any compound usable as a substrate, within the scope of the present invention is contemplated.

The laminated structure can be made by coating the inventive hot melt adhesive on at least one side of the substrate. A sandwich style laminate is also contemplated within the scope of the invention.

The present invention also relates to non-woven articles, such as disposable diapers, prepared using the novel hot melt adhesive and it is anticipated that non-wovens made from this novel hot melt adhesive will be capable of exhibiting good flexibility at the bonds, and have substantial value in the disposable items market sector.

The novel non-woven articles can be prepared from non-woven fabrics, polymer webs, or similar materials. The present invention is especially useful as a disposable item, like a diaper. The non-woven material may be a disposable material. It may be biodegradable. Specific examples of non-woven material substrates usable herein include cellulose, and polypropylene matrices.

Adhesive Preparation

Adhesives are prepared using either a small Brabender compounding head (approximately 50 cc capacity) or a one quart sigma blade mixer. The test formulations are easily blended using preheated equipment (170°-180° C.) by introducing the polybutylene polymer, mixing until a soft, homogeneous mass is formed, and then gradually introducing the remaining ingredients. Mixing times can be about 20 minutes.

Test Specimen Preparation

Thin adhesive films (125 to 200 microns) can be prepared by casting onto release coated polyester film (onto release coated side) using a pair of heated nip rolls that are adjusted to produce the desired gap, (hence the defined adhesive thickness). Preheated adhesive (at about at least 140° C. and up to 200° C.) can be poured onto a polyester film and hand drawn through the heated nip rolls. Alternatively, the adhesive can be poured onto the substrate and a "doctor blade" can "draw down" the adhesive to achieve a uniform coating on the substrate. Other methods of applying hot melt adhesive can also be used. For continuous or non-continuous application, techniques such as spraying the adhesive, using hot melt guns to apply adhesive or extruding the adhesive can be used. Using the first described technique, adhesive films, 4" wide and 8" long, can be produced with a small quantity (<60 gms) of adhesive, so that very small quantities of adhesive can be evaluated.

Once cooled and allowed to set, these adhesives can be used to prepare test specimens. For example, Kraft paper to Kraft paper, polypropylene to polypropylene and polyethylene to polyethylene bonds can be made by cutting adhesive squares from the polyester film, peeling them off, placing the adhesive between the paper and heat sealing with a hot bar sealer (time, pressure and temperature can be adjusted). Alternately, the adhesive square or an adhesive strip may be placed on a piece of plastic or metal substrate, melted with a heat gun (or in an oven), and then joined under moderate contact pressure to form T-peel, Lap shear or SAFT bonded substrate specimens.

TESTING METHODS

1. Adhesive Hot Melt Viscosity—Viscosities can be measured at 177° C. in a brookfield Thermocell Viscometer with an RVT head and Number 29 spindle (ASTM D3236); for low viscosity formulations, a number 27 spindle can be used.
2. Peel Strength—a 25 mm X 150 mm laminate sandwich can be formed with the substrate of interest, the adhesive as the interlayer between the substrate surfaces. The laminate surfaces can be placed in an Instron tester, one surface in the lower jaw. The jaws can be separated at a rate of 25 cm/min. Force required to peel the surfaces can be recorded continuously. The maximum and minimum values should be noted, as well as failure mode, i.e., adhesive, cohesive, or a combination. This test should approximate a peel angle of about 90° (T-peel).

What is claimed is:

1. A hot melt adhesive, having an open time of ten minutes or less comprising:
   from about 50 percent by weight to about 5 percent by weight of a member of the group comprising butene-1 homopolymer, butene-1-ethylene copolymer having 11–30 mole % ethylene comonomer, and butene-1 copolymers having 1–30 mole % of a comonomer selected from the group consisting of an alpha olefin having 5–8 carbon atoms;
   from about 50 percent by weight to about 95 percent by weight of a tackifying resin;
   from about 0.01 to about 1 phr of a nucleating agent;
   up to about 1 part per hundred (phr) of a stabilizer;
   up to about 30 phr of a plasticizer; and
   up to about 30 phr of a wax.
2. The hot melt adhesive of claim 1, further comprising:
   from about 50 percent by weight to about 30 percent by weight of the butene-1 homopolymer or copolymer; and
   from about 50 percent by weight to about 70 percent by weight of the tackifying resin.
3. The hot melt adhesive of claim 1, further comprising:
   about 50 percent by weight of the butene-1 homopolymer or copolymer; and
   about 50 percent by weight of the tackifying resin.
4. The adhesive of claim 1, wherein said stabilizer is a hindered phenol.
5. The adhesive of claim 1, wherein said stabilizer is a tetrakis[methylene (3,5 di-tert-butyl-4-hydroxyhydrocinnamate)] methane.

6. The adhesive of claim 1 wherein said nucleating agent is a member of the group: isotactic polypropylene, polyethylene, polyethylene wax, fatty acid amides, amides, stearamide, anthraquinones, and graphitic non-turbostratic carbon.

7. The adhesive of claim 1, wherein said tackifying resin is a member of the group of non-polar tackifying resins consisting of:
partially hydrogenated hydrocarbon resin, completely hydrogenated hydrocarbon resin, polyterpene, $C_5$ stream resin, and $C_9$ stream resin.

8. The adhesive of claim 1, wherein said tackifying resin is a polar tackifying resin which is at least partially compatible with the butene-1 homopolymer or copolymer.

9. The adhesive of claim 1, wherein the plasticizer is oil.

10. A laminar structure comprising a substrate which is bonded with a hot melt adhesive and wherein said adhesive has an open time of ten minutes or less and comprises:
from about 50 percent by weight to about 5 percent by weight of a member of the group comprising butene-1 homopolymer, butene-1-ethylene copolymer having 11-30 mole % ethylene comonomer, and butene-1-copolymers having 1-30 mole % of a comonomer selected from the group consisting of an alpha olefin having 5-8 carbon atoms;
from about 50 percent by weight to about 95 percent by weight of a tackifying resin;
from about 0.01 to about 1 phr of a nucleating agent;
up to about 1 part hundred (phr) of a stabilizer;
up to about 30 phr of a plasticizer; and
up to about 30 phr of a wax.

11. The laminar structure of claim 10, comprising a substrate which is bonded with a hot melt adhesive wherein said adhesive further comprises:
from about 50 percent by weight to about 30 percent by weight of the butene-1 homopolymer or copolymer; and
from about 50 percent by weight to about 70 percent by weight of the tackifying resin.

12. The laminar structure of claim 10, comprising a substrate which is bonded with a hot melt adhesive wherein said adhesive further comprises:
about 50 percent by weight of the butene-1 homopolymer or copolymer; and
about 50 percent by weight of the tackifying resin.

13. The laminar structure of claim 10, wherein said substrate is selected from the group consisting of high density polyethylene, polypropylene, paper, aluminum foil, and poly-4-methylpentene.

14. The laminar structure of claim 10, wherein said stabilizer of said adhesive is a hindered phenol.

15. The laminar structure of claim 10, wherein said stabilizer of said adhesive is tetrakis[methylene(3,5 di-tertbutyl-4-hydroxyhydrocinnamate)]methane.

16. The laminar structure of claim 10, wherein said tackifying resin of said adhesive is a member of the group of non-polar tackifying resins consisting of:
partially hydrogenated hydrocarbon resin, completely hydrogenated hydrocarbon resin, polyterpene, $C_5$ stream resin and $C_9$ stream resin.

17. The laminar structure of claim 10, wherein said tackifying resin of said adhesive is a polar tackifying resin which is at least particularly compatible with the butene-1 homopolymer or copolymer.

18. The laminar structure of claim 10, wherein said wax of said adhesive is a microcrystalline wax.

19. The laminar structure of claim 10, wherein said nucleating agent of said adhesive consists of a member of the group: isotactic polypropylene, polyethylene, polyethylene wax, fatty acid amides, amides, stearamide, anthraquinones, and graphitic non-turbostratic carbon.

20. The laminar structure of claim 10, wherein said plasticizer of said adhesive is oil.

21. A non-woven article prepared from a non-woven substrate and a hot melt adhesive, wherein said adhesive has an open time of ten minutes or less and consists essentially of:
from about 50 percent by weight to about 5 percent by weight of a member of the group comprising butene-1 homopolymer, butene-1-ethylene copolymer having 11-30 mole % ethylene comonomer, and butene-1 copolymers having 1-30 mole % of a comonomer selected from the group consisting of an alpha olefin having 5-8 carbon atoms;
from about 50 percent by weight to about 95 percent by weight of a tackifying resin;
from about 0.01 to about 1 phr of a nucleating agent;
up to about 1 part per hundred (phr) of a stabilizer;
up to about 30 phr of a plasticizer; and
up to about 30 phr of a wax.

22. The non-woven article of claim 21, wherein said hot melt adhesive further comprises:
from about 50 percent by weight to about 30 percent by weight of the butene-1 homopolymer or copolymer; and
from about 50 percent by weight to about 70 percent by weight of the tackifying resin.

23. The non-woven article of claim 21, wherein said hot melt adhesive further comprises:
about 50 percent by weight of the butene-1 homopolymer or copolymer; and
about 50 percent by weight of the tackifying resin.

24. The non-woven article of claim 21, wherein said stabilizer of said adhesive of said adhesive is a hindered phenol.

25. The non-woven article of claim 21, wherein said stabilizer of said adhesive is a tetrakis[methylene (3,5 di-tert-butyl-4-hydroxyhydrocinnamate)] methane.

26. The non-woven article of claim 21, wherein said nucleating agent of said adhesive is a member of the group: isotactic polypropylene, polyethylene, polyethylene wax, fatty acid amides, amides, stearamide, anthraquinones, and graphitic non-turbostratic carbon.

27. The non-woven article of claim 21, wherein said tackifying resin of said adhesive is a member of the group of non-polar tackifying resins consisting of:
partially hydrogenated hydrocarbon resin, completely hydrogenated hydrocarbon resin, polyterpene, $C_5$ stream resin, and $C_9$ stream resin.

28. The non-woven article of claim 21, wherein said tackifying resin of said adhesive is a polar tackifying resin which is at least partially compatible with the butene-1 homopolymer or copolymer.

29. The non-woven article of claim 21, wherein the plasticizer of said adhesive is oil.

30. The non-woven article of claim 21, wherein said non-woven substrate is a member of the group: cellulose, non-woven fabric, and polymer web.

31. The non-woven article of claim 21, wherein said non-woven substrate is a polypropylene matrix.

* * * * *